US009501156B2

(12) United States Patent
Linegar et al.

(10) Patent No.: US 9,501,156 B2
(45) Date of Patent: *Nov. 22, 2016

(54) ADJUSTABLE ERGONOMIC KEYBOARD

(71) Applicant: Key Ovation LLC, Cedar Park, TX (US)

(72) Inventors: Chris Linegar, Sydney (AU); Mark Norwalk, Austin, TX (US)

(73) Assignee: Key Ovation, LLC, Cedar Park, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/936,257

(22) Filed: Nov. 9, 2015

(65) Prior Publication Data

US 2016/0139681 A1    May 19, 2016

Related U.S. Application Data

(63) Continuation of application No. 14/454,235, filed on Aug. 7, 2014, now Pat. No. 9,182,829, which is a continuation of application No. 13/865,755, filed on Apr. 18, 2013, now Pat. No. 8,823,652, which is a continuation of application No. 12/712,911, filed on Feb. 25, 2010, now Pat. No. 8,427,428.

(60) Provisional application No. 61/295,093, filed on Jan. 14, 2010, provisional application No. 61/250,402, filed on Oct. 9, 2009, provisional application No. 61/165,386, filed on Mar. 31, 2009.

(51) Int. Cl.
*G06F 3/02* (2006.01)
*G06F 1/16* (2006.01)

(52) U.S. Cl.
CPC ........... *G06F 3/0216* (2013.01); *G06F 1/1664* (2013.01); *G06F 1/1667* (2013.01); *G06F 3/0221* (2013.01)

(58) Field of Classification Search
CPC ...... G06F 3/02; G06F 3/0213; G06F 3/0216; G06F 3/0221
USPC .................................................. 345/156–169
See application file for complete search history.

(56) References Cited

U.S. PATENT DOCUMENTS

| | | |
|---|---|---|
| 5,073,050 A | 12/1991 | Andrews |
| 5,267,127 A | 11/1993 | Pollitt |
| 5,336,001 A | 8/1994 | Lichtenberg |
| 5,424,728 A | 6/1995 | Goldstein |
| 5,426,449 A | 6/1995 | Danziger |
| 5,502,460 A | 3/1996 | Bowen |
| 5,543,787 A | 8/1996 | Karidis et al. |
| 5,613,786 A | 3/1997 | Howell et al. |
| 5,800,085 A | 9/1998 | Lee |

(Continued)

FOREIGN PATENT DOCUMENTS

WO    WO 2010117730    10/2010

*Primary Examiner* — Vijay Shankar
(74) *Attorney, Agent, or Firm* — Dykema Gossett PLLC

(57) ABSTRACT

An adjustable ergonomic keyboard includes keyboard segments coupled by a joint allowing the keyboard segments to pivot relative to one another. A retainer secures a corresponding keyboard segment with respect to a base support and allows the corresponding retained keyboard segment to rotate thereabout and to travel laterally with respect to the base support. The base support may be part of a portable laptop chassis or body or may be a stand-alone base for use of the keyboard as a peripheral data input device.

33 Claims, 15 Drawing Sheets

(56) References Cited

U.S. PATENT DOCUMENTS

| | | |
|---|---|---|
| 6,641,316 B1 | 11/2003 | Goldstein et al. |
| 6,984,081 B1 | 1/2006 | Goldstein et al. |
| 8,427,428 B2 | 4/2013 | Linegar et al. |
| 8,823,652 B2 | 9/2014 | Linegar et al. |
| 9,182,829 B2 * | 11/2015 | Linegar ................ G06F 1/1664 |
| 2005/0002158 A1 | 1/2005 | Olodort et al. |
| 2006/0210340 A1 | 9/2006 | Atzmon |
| 2007/0285395 A1 | 12/2007 | Hargreaves et al. |
| 2010/0245250 A1 | 9/2010 | Linegar et al. |

* cited by examiner

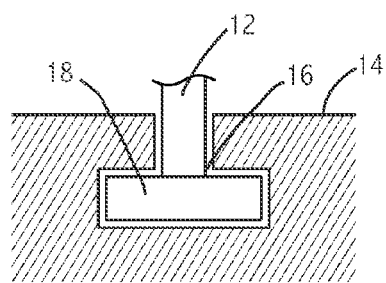
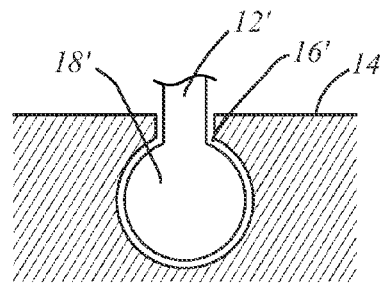
*FIG. 6A*          *FIG. 6B*
*FIG. 7*

ADJUSTABLE ERGONOMIC KEYBOARD

CROSS-REFERENCE TO RELATED APPLICATION(S)

The present application is a Continuation of U.S. application Ser. No. 14/454,235, filed Aug. 7, 2014, now U.S. Pat. No. 9,182,829 issued on Nov. 10, 2015, which is a Continuation of U.S. application Ser. No. 13/865,755, filed Apr. 18, 2013, now U.S. Pat. No. 8,823,652 issued on Sep. 2, 2014, which is a Continuation of U.S. application Ser. No. 12/712,911, filed Feb. 25, 2010, now U.S. Pat. No. 8,427,428 issued on Apr. 23, 2013, which in turn claims the benefit of U.S. Provisional Application Nos. 61/295,093, filed Jan. 14, 2010, 61/250,402, filed Oct. 9, 2009 and 61/165,386, filed Mar. 31, 2009.

BACKGROUND

1. Field of the Invention

The following invention relates generally to keyboards, and more particularly to adjustable ergonomic keyboard configurations integrated or integrable with a stand alone base or a portable computing device.

2. Description of the Related Art

Keyboards of the type used at computer terminals conventionally include a unitary board onto which alphanumeric keys are attached. It is often a disadvantage of such conventional keyboards that the wrists and/or arms and shoulders of a human user must be contorted into a configuration which may be stressful, particularly after prolonged use of the keyboard. This problem is brought about by the fact that, in most conventional unitary keyboard designs and key arrangements, the hands of the user must be turned outwardly by pivoting of the wrists relative to the forearms, resulting in ulnar deviation. Discomfort to the user caused by pronation of the wrists is also a problem with these conventional keyboards. Pronated postures can also transmit stresses into the neck and shoulders of the user.

It is generally desirable to reduce pronation and ulnar deviation of the wrists in computer keyboards. To that end, U.S. Pat. No. 6,984,081 describes adjustable keyboards with at least two segments which are movable relative to one another via a hinge or joint. By moving the segments, the orientation of the user's wrists and hands can be adjusted to allow for reduction of ulnar deviation and pronation of the wrists. Successful commercial embodiments generally in accord with such a design include the Goldtouch™ adjustable keyboard and the Goldtouch Go!™ travel keyboard, both available from KeyOvation, LLC, Cedar Park, Tex.

Unfortunately, while adjustable ergonomic keyboards such as the aforementioned Goldtouch keyboard (and competing designs) provide desktop users with practical options to reduce pronation and ulnar deviation that may otherwise be associated with use of conventional unitary detached keyboards, portable computing devices (including laptop-, notebook- or netbook-type computers) have few options other than connection (e.g., by USB cable) of an auxiliary adjustable ergonomic keyboard. For some users, this may not be an attractive solution.

Accordingly, improved solutions are desired.

SUMMARY

It has been discovered that an integrated, yet adjustable ergonomic keyboard may be provided using a design that accommodates simultaneous tenting and splaying of first and second keyboard segments that each include on an upper surface thereof respective subsets of keys that together define a generally complete alphanumeric keyboard. A retainer extends from each of the first and second keyboard segments to retain the respective keyboard segment with respect to a base support. In general, the base support may include a stand-alone desktop platform or be integral (or integrable) with a portable computing device. The respective retainers allow the corresponding retained keyboard segment to rotate thereabout and to travel laterally with respect to the base support while retained. A joint couples the keyboard segments and allows the keyboard segments to pivot relative to one another.

Upward travel of the joint generally allows the keyboard segments to pitch or "tent", while at least one of the retainers allows an outer edge of the respective keyboard segment to travel laterally in correspondence with the tenting. Lateral travel of the joint (typically in a direction toward a human user) allows the keyboard segments to splay while each rotates correspondingly around an axis of a respective one of the retainers. Working together, the joint and retainers allow the keyboard segments to simultaneously tent and splay, while retained with respect to the base support. Notwithstanding the forgoing, tenting-only or splaying-only embodiments or configurations may be provided, if desired.

In some embodiments, the keyboard segments may be supplied in a configuration suitable for integration with a stand-alone base or a portable computing device, while in others, the keyboard segments may be integrated with such a base or portable computing device when supplied.

In general, a variety of attachment configurations are contemplated. For example, in some embodiments, retainers are generally fixed to respective keyboard segments and opposing ends of the retainers are allowed to travel in suitably defined channels. For example, in some embodiments, channels are defined in the upper surface of the base support, one end of each of the retainers is connected to a respective one of the keyboard segments, and respective ones of the channels allow lateral travel of respective ones of the retainers across a portion of the upper surface in correspondence with tenting of the keyboard segments. In some embodiments, suitable channels are instead defined in a lower surface of the keyboard segments. In some such embodiments, respective ones of the channels allow lateral travel of the keyboard segments with respect to respective ones of the retainers, while an opposing end of each of the retainers is generally fixed to the base support. As before, the base support may include a stand-alone desktop platform or be integral (or integrable) with a portable computing device.

In some embodiments, in a stowed position, the keyboard segments are retained at a first, closely spaced distance from the upper surface, whereas in one or more deployed positions, the keyboard segments are retained at a distance from the upper surface that exceeds the first distance and accommodates tenting action of the keyboard segments. In some variations, deployed positions include at least one shifted forward keyboard position. In some cases, the retainers may also permit the keyboard segments to be shifted or slid forward relative to a support structure.

In some embodiments, springs concentric with the retainers are used to urge the keyboard segments from the stowed position to at least one of the deployed positions. In some embodiments, the keyboard is moveable between stowed and deployed positions without the need for a spring or other biasing means. In some embodiments, one or more latches are provided to retain the keyboard segments in the stowed position.

In some embodiments, a generally planar surface is provided that is suitable for desktop use or for affixing to an upper surface of a portable computing device, wherein the retainers are coupled to the generally planar surface. In some cases, the generally planar surface is configured as a keyboard attachment platform that itself provides stowed and deployed positions. In some cases, one or more channels (such as previously described) are defined in the generally planar surface and one end of each of the retainers is connected to a respective one of the keyboard segments. The respective channel then allows lateral travel of respective ones of the retainers across a portion of the generally planar surface in correspondence with tenting of the keyboard segments. In other cases, one or more channels may instead be defined in a lower surface of the keyboard segments. Respective ones of the channels then allow lateral travel of the keyboard segments with respect to respective ones of the retainers, and opposing ends of each of the retainers are attached to the base support.

In some embodiments, retainers each include, at a first end thereof, a surface frictionally engageable to restrict travel of the respective retainer in a corresponding channel. In some embodiments, a locking mechanism is used to urge the frictionally engageable surfaces into a held position and thereby maintaining the keyboard segments in a tented position, a splayed position or a tented and splayed position. Frictionally engageable surfaces of the retainers may exhibit an at least partially convex profile, particularly if desirable to accommodate (at the corresponding end) at least some rotational freedom of movement. Likewise, the retainers each include at a second end thereof an at least partially convex end cap suitable for attaching the corresponding retainer while still allowing rotation freedom of movement in correspondence with tenting action of the keyboard segments.

Another aspect of the invention features a portable computing device including a body portion; a screen containing lid portion hingedly attached to the body portion. The body portion presents a generally planar keyboard attachment surface or base support having channels defined therein to receive retainers extending upward toward respective first and second keyboard segments pivotably coupled at a joint. The channels are adapted to retain the respective retainers while allowing the retainers to travel laterally with respect to the keyboard attachment surface in correspondence with tenting and splaying of the keyboard segments. The keyboard segments each include on an upper surface thereof a respective subset of keys that together define a generally complete alphanumeric keyboard.

In some implementations the respective retainers allow the corresponding retained keyboard segment to rotate thereabout and to travel laterally with respect to the keyboard attachment surface while retained.

Another aspect of the invention features an apparatus including first and second keyboard segments each including on an upper surface thereof respective subsets of keys that together define a generally complete alphanumeric keyboard. A retainer extends from each of the first and second keyboard segments to retain the respective keyboard segment with respect to a base support. The respective retainers allow the corresponding retained keyboard segment to rotate thereabout and at least one of the retained keyboard segments to travel laterally with respect to the base support. A joint couples the keyboard segments and allows the keyboard segments to pivot relative to one another.

In some implementations, upward travel of the joint allows the keyboard segments to tent, and at least one of the retainers allows an outer edge of the respective keyboard segment to travel laterally relative to the base support in correspondence with the tenting. Substantially lateral travel of the joint allows the keyboard segments to splay while each rotating correspondingly around a respective one of the retainers.

In some cases, the base support is an upper surface of a portable computing device. The base support defines at least one channel and each of the retainers is connected to a respective one of the keyboard segments, and wherein the respective channel allows lateral travel of the respective retainer across a portion of the base support in correspondence with tenting of the keyboard segments.

In some implementations, at least one of the retainers includes at a first end thereof a surface frictionally or matingly engageable with the base support to restrict travel of the respective retainer in a corresponding channel.

In some implementations, the base support is a stand alone base and the apparatus is configured as a peripheral input device.

In some implementations, first and second data output connectors are positioned respectively on the first and second keyboard segments adjacent the respective retainers. In some cases, both the respective retainer and data output connector are positioned substantially in an upper-outer quadrant of the respective keyboard segment.

In a particular implementation, the keyboard segments arc configured to allow for at least one of splaying of about 30 degrees and tenting of about 30 degrees.

Another aspect of the invention features a portable computing device including a body portion and a screen containing lid portion hingedly attached to the body portion. The body portion presents a keyboard attachment surface having at least one channel defined therein to receive a retainer of one of a respective first and second keyboard segment pivotably coupled at a joint, the channel adapted to allow the retainer to travel laterally with respect to the keyboard attachment surface in correspondence with tenting and splaying of the keyboard segments.

In some implementations, a respective retainer allows the corresponding retained keyboard segment to rotate thereabout and to travel laterally with respective to the keyboard attachment surface.

In some implementations, the keyboard is configured to allow for at least one of splaying of about 30 degrees and tenting of about 30 degrees.

In some implementations, closure of the screen containing laptop lid returns the keyboard to a stowed position. In some implementations, the laptop lid is prevented from closing while the keyboard is in a deployed position.

In some implementations, the keyboard is disposed within a recess in the laptop body such that the edges of the keyboard are disposed adjacent or below an upper portion of the laptop body. In some cases, a bezel surrounds or partially encloses the keyboard retained in the laptop body.

While the forgoing represents a description of certain illustrative embodiments of the present invention, it is to be understood that the appended claims recite features of the present invention(s), and that additional embodiments are contemplated and may fall within the scope of the claims. Some aspects of the present invention, and in particular some exemplary pivoting motions of a ball and socket type joint used to connect first and second keyboard sections while allowing the tenting and splaying actions described herein will be understood by reference to U.S. Pat. No. 6,984,084 to Goldstein et al., the entirety of which is incorporated by reference herein.

BRIEF DESCRIPTION OF THE DRAWINGS

The present invention may be better understood, and its numerous objects, features, and advantages made apparent to those skilled in the art by referencing the accompanying drawings.

FIG. 1A depicts the adjustable integrated ergonomic keyboard in a stowed position. FIG. 1B depicts the adjustable integrated ergonomic keyboard in a released, but unlocked position. FIG. 2 depicts the adjustable integrated ergonomic keyboard in a tented and locked position. FIG. 3 depicts the adjustable integrated ergonomic keyboard in a tented, splayed and locked position. FIG. 4 depicts the adjustable integrated ergonomic keyboard in a tented and locked position within a recess in the laptop body. FIG. 5 depicts the adjustable integrated ergonomic keyboard in a tented, splayed and locked position extending partially beyond a recess in the laptop body.

FIGS. 6A and 6B depict retained-end configurations suitable for allowing lateral travel in a channel and/or rotational freedom of movement for retainers employed in some implementations of the present invention.

FIG. 7 depicts a top plan view of channels defined in a surface to accommodate lateral travel and/or rotational freedom of movement of retainers in correspondence with stowed, tented and splayed positions of an adjustable integrated ergonomic keyboard in accordance with some implementations of the present invention.

FIG. 18 depicts the adjustable integrated ergonomic keyboard in a stowed position. FIG. 19 depicts the adjustable integrated ergonomic keyboard in a released, but unlocked position. FIG. 20 depicts the adjustable integrated ergonomic keyboard in a tented and locked position. FIG. 21 depicts the adjustable integrated ergonomic keyboard in a tented, splayed and locked position.

DETAILED DESCRIPTION

Figure 1A:
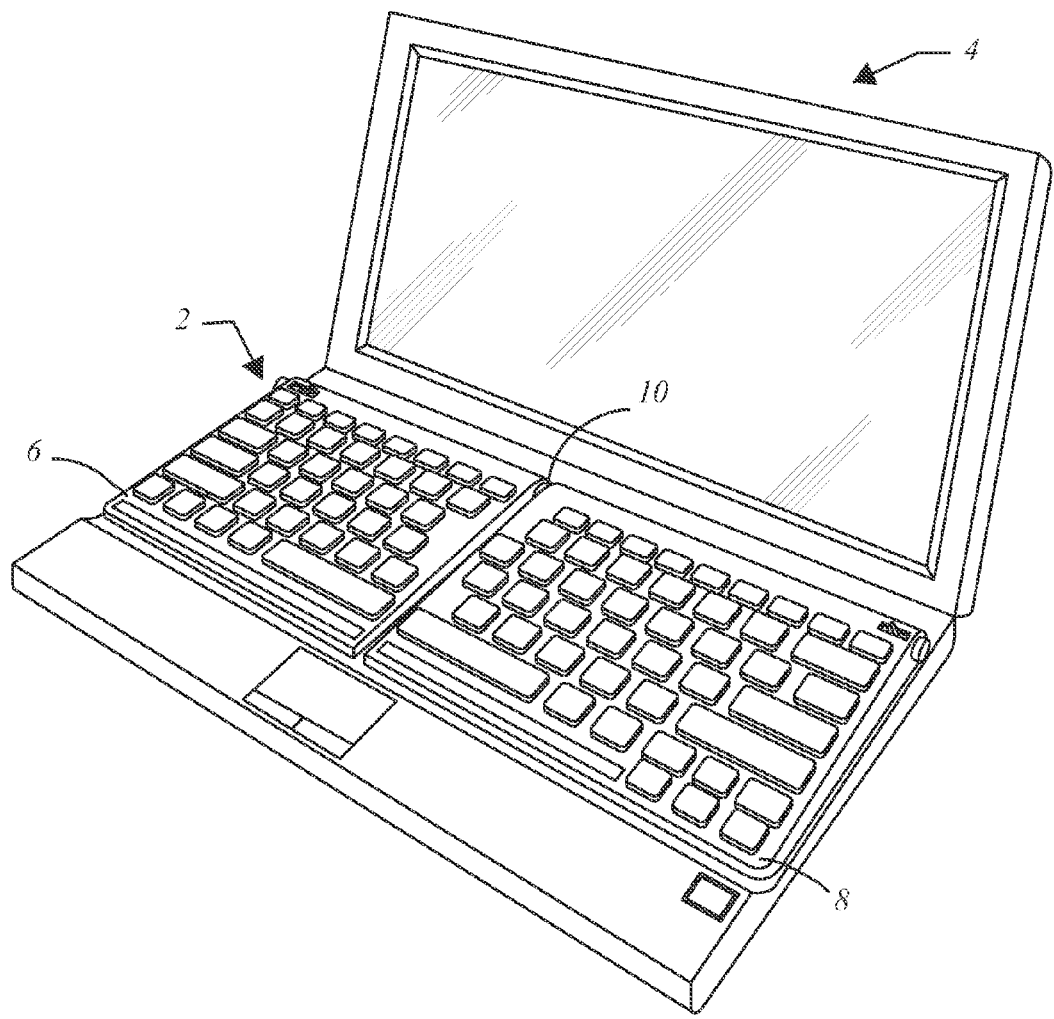
FIGS. 1A, 1B, 2-5 depict various positions of an adjustable ergonomic keyboard integrated in a laptop computer application in accordance with some implementations of the present invention.
Figure 1B:
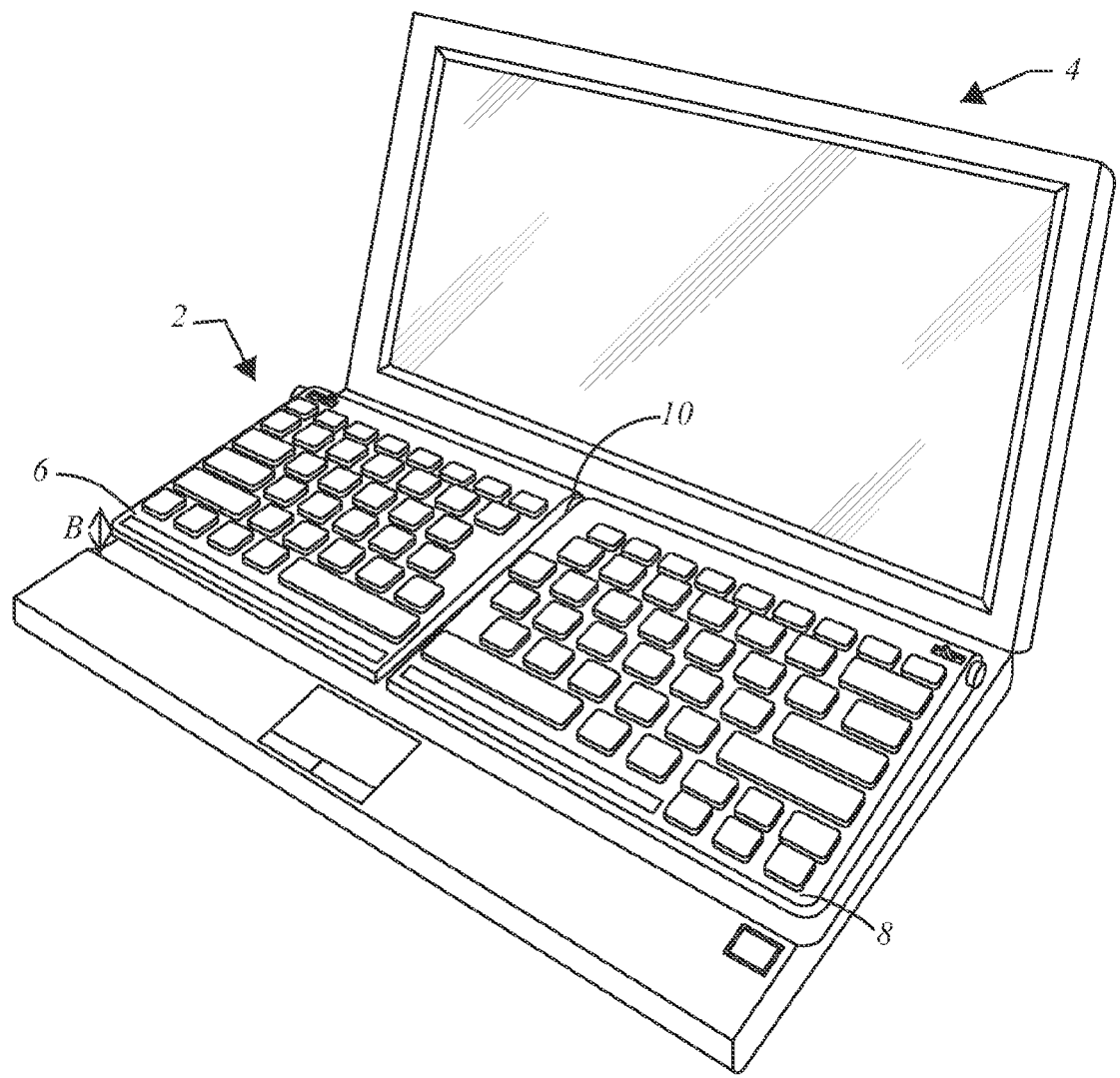

With reference to FIGS. 1A, 1B, an adjustable ergonomic keyboard 2 is integrated with a portable computer or a laptop 4. Keyboard 2 includes first and second keyboard segments 6, 8. Keyboard segments 6, 8 are attached to one another at a top portion by a hinge or joint 10 such that segments 6, 8 are mutually pivotable. Joint 10 provides multiple degrees of freedom of movement between segments 6, 8. Advantageously, joint 10 is adapted to allow pivoting in both horizontal and vertical planes of the adjacent coupled keyboard segments 6, 8. Joint 10 my be a ball and socket joint, living hinge, or combination of joints or structures suitable to couple segments 6, 8 with the described degrees of freedom.

With reference to FIG. 1A, keyboard 2 may be inset or retained in a first stowed position "A" during transport of laptop 4 or during use of keyboard 2 in a conventional keyboard position. With reference to FIG. 1B, keyboard 2 is moveable from the stored position "A" to a partially deployed position "B," in which segments 6, 8 are spaced with sufficient clearance from the body of laptop 4 to permit pivoting between segments 6, 8 in the horizontal and/or vertical planes. For example, keyboard 2 may "pop-up" an initial distance from the body of laptop 4 into partially deployed position "B" to provide such clearance. Such "pop-up" deployment may be provided, for example, by release of a spring loaded stowed locking mechanism. In some implementations, the laptop body provides sufficient clearance for tenting and/or splaying without the need for initial "pop-up" clearance.

In partially deployed position "B," adjustable integrated ergonomic keyboard 2 is in an unlocked position to be freely moved to a desired operating position. In alternative implementations, the body of laptop 4 may be configured to allow pivoting of segments 6, 8 directly from a stored position, for example, by providing sufficient clearance from laptop body contours surrounding keyboard 2.

Figure 2:
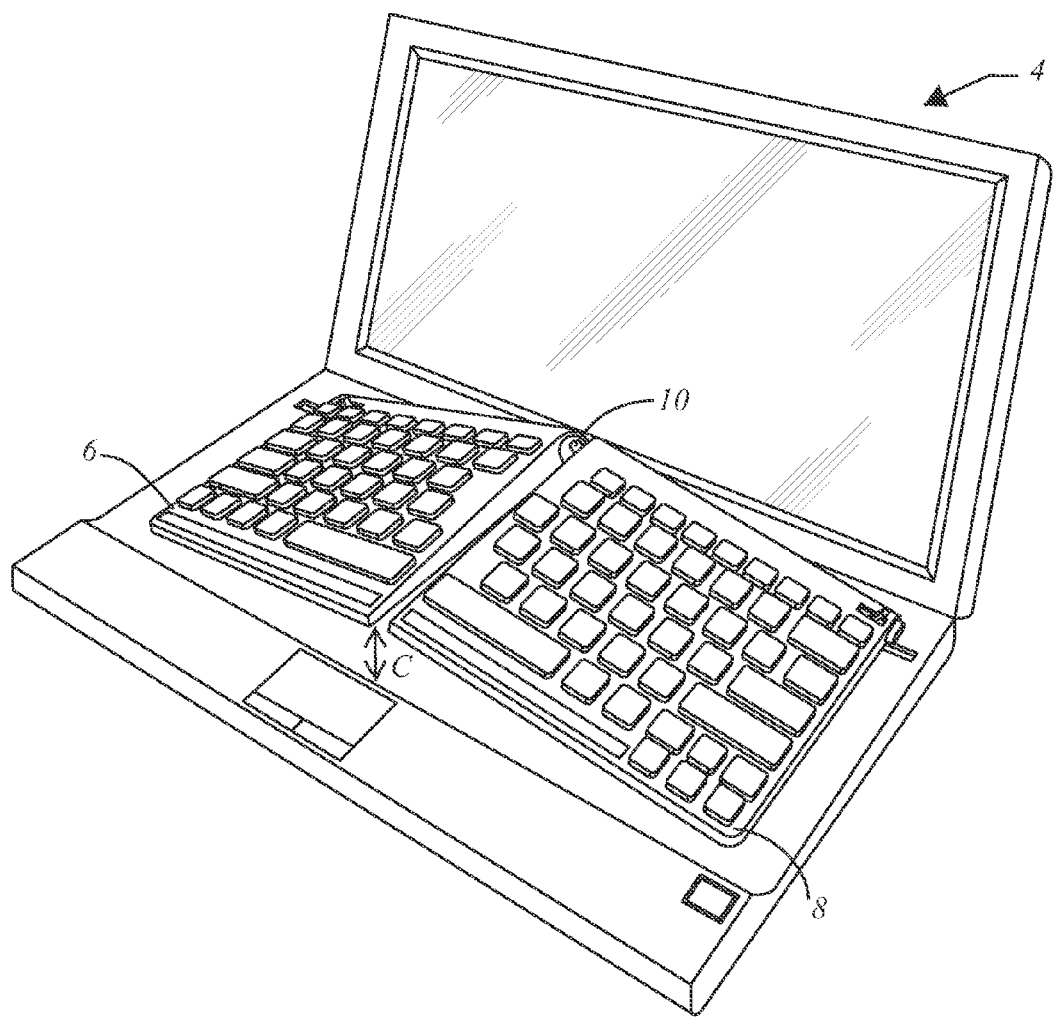
Figure 3:
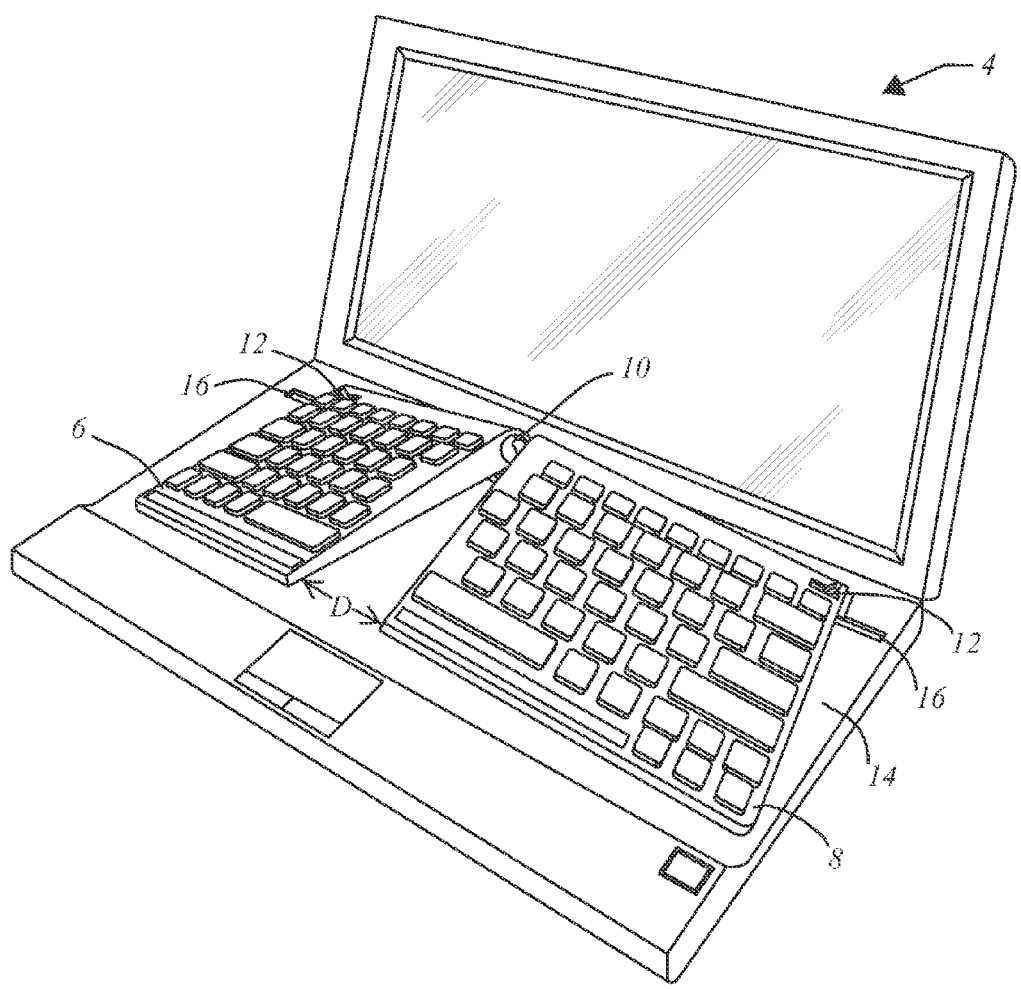

Note that in some embodiments, such as that illustrated in FIGS. 2-3, surface contours of the laptop body may accommodate motion between stored and deployed positions. Such surface contours may include, for example, tapered or rounded undercuts at the periphery of keyboard 2 and/or recesses in the laptop body adjacent the periphery of keyboard 2.

Figure 4:
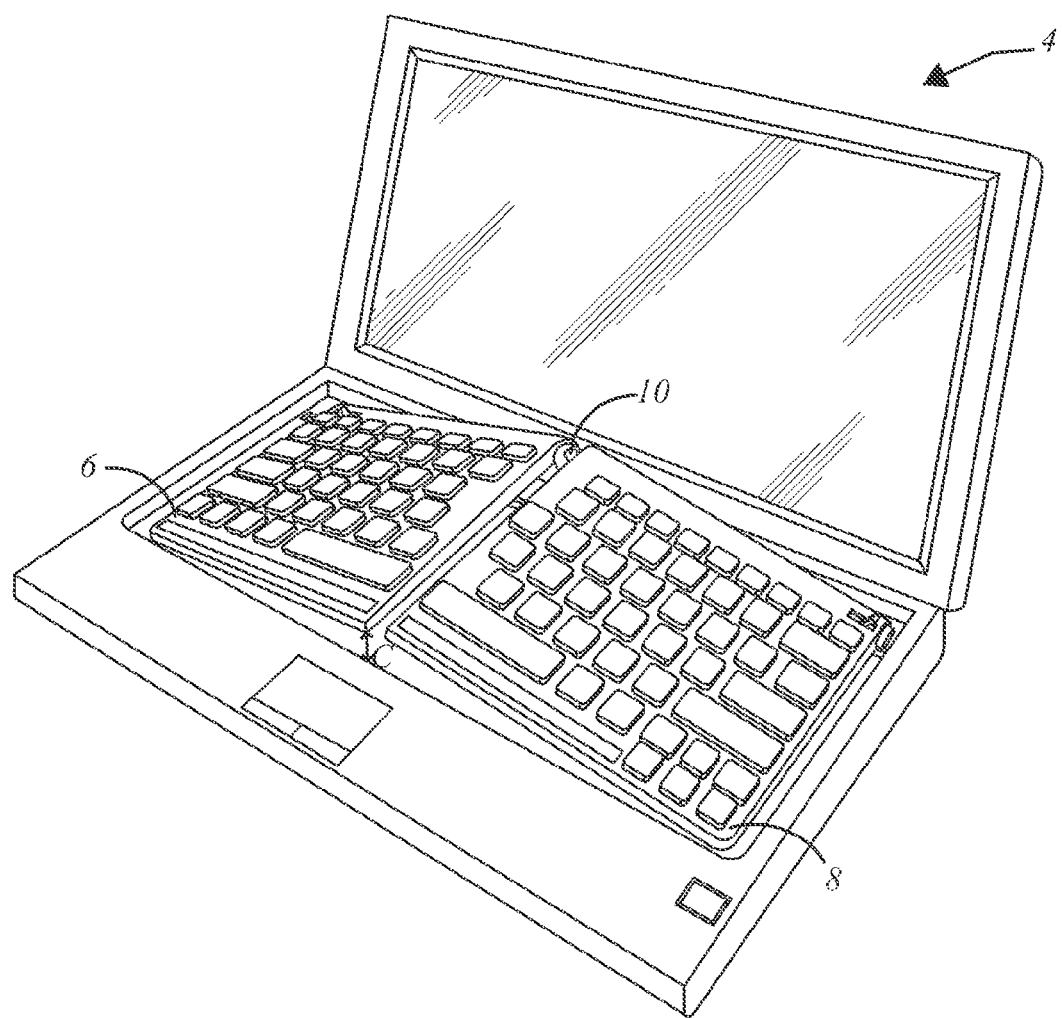
Figure 5:
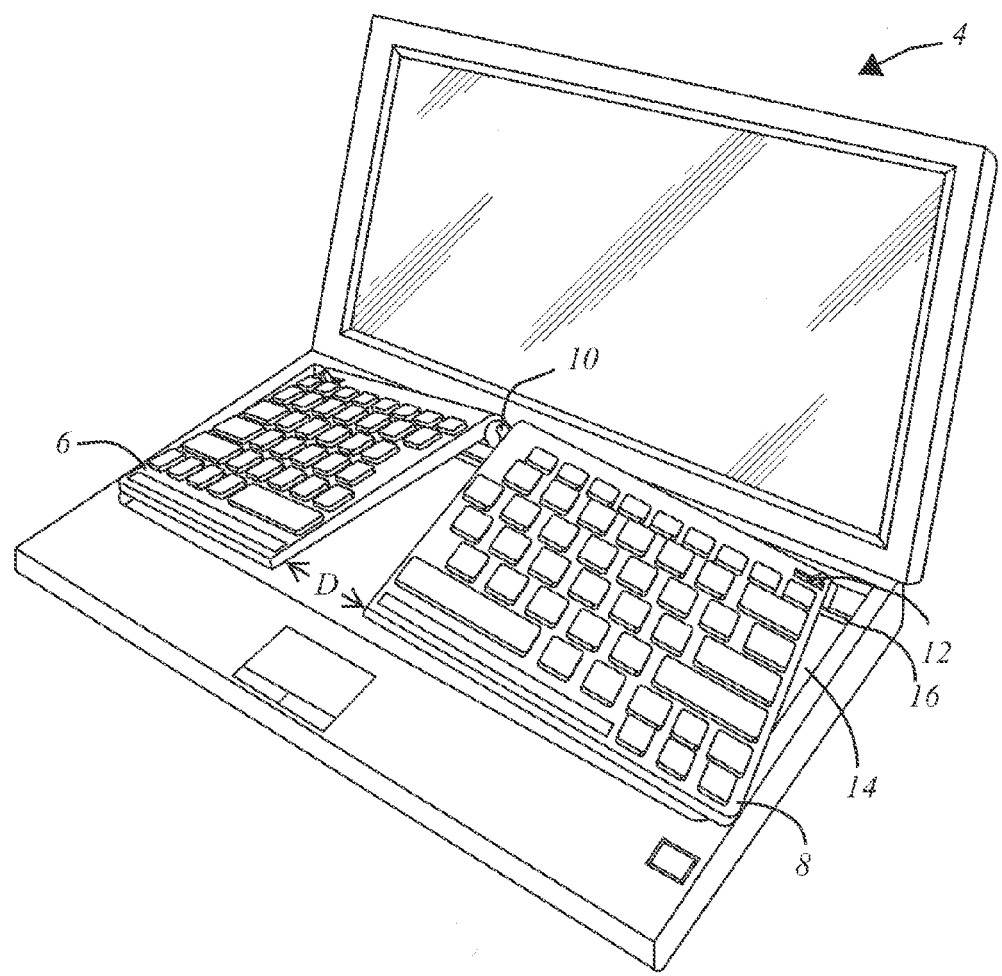

In some embodiments, such as that illustrated in FIGS. 4-5, it may be advantageous for keyboard 2 (or the laptop body) to be adapted to allow initial tenting motion to then provide additional clearance for splaying motion. For example, with reference to FIG. 4, keyboard 2 is initially movable from a stowed inset position within a recess in the laptop body to a tented position C within the recess. With reference to FIG. 5, keyboard 2 is then movable from tented position C to a tented and splayed position D. In the tented and splayed position D, a portion of the keyboard extends beyond the recess in the laptop body over a portion of the laptop body that is adjacent the keyboard when in the stowed position. Thus, keyboard 2 may be movable to partially extend over a bezel, laptop cover or other structure provided along an outer edge of keyboard 2. In some cases, a portion of the keyboard may extend under an adjacent bezel or cover portion in the stowed position, for example, to aid in locking the keyboard in the stowed position.

In some cases, surface contours of a portion of the laptop body cover or bezel adjacent keyboard 2 may include, for example, tapered or rounded contours at the periphery of keyboard 2 to provide clearance for splaying of the keyboard segments. As previously discussed, vertical keyboard segment movement may also be used to provide clearance for splaying of the keyboard segments.

With continued reference to FIG. 2, segments 6, 8 are pivotable within a vertical plane so that the center of keyboard 2 is elevated or pitched to a "tented" position "C." Tented position "C" reduces pronation and decreases tension in the wrists and forearms of the user. Joint 10 can be a ball and socket joint providing a range of movement in both the vertical and horizontal planes. In a particular implementation, joint 10 allows tenting of at least about thirty degrees between base support 14 and segments 6, 8. Similarly, joint 10 allows splaying of about thirty degrees between segments 6, 8.

Keyboard 2 with joint 10 preferably allows users to select a desired combination of tenting and splaying positions within a full ergonomically acceptable range. In some implementations, users may alternatively select an operational keyboard position from a combination of available discrete vertical and horizontal positions. Such positioning may be achieved using multiple joints providing discrete degrees of freedom. Further discrete positioning may be provided via a combination of ratcheting joints, or the like. Alternatively, joint may be a dimpled ball in a complementary socket arranged to provide variable positioning of segments 6, 8 in any desired combination of tented and splayed positions without regard to discrete positions or more limited degrees of freedom. Accordingly, joint 10 may be any coupling suitable to couple segments 6, 8 and to provide sufficient range of movement for tenting and splaying of segments 6, 8.

With reference to FIG. 3, segments 6, 8 are pivotable such that a front edge of keyboard 2 may spread apart in at least a substantially horizontal plane to a "splayed" position "D". The splayed position "D" reduces ulnar deviation in the keyboard user. In the illustrated configuration, keyboard 2 is both tented and splayed, although in some embodiments, keyboard segments 6, 8 may be in a purely splayed or purely tented position.

With continued reference to FIG. 3, keyboard segments 6, 8 are movably secured by retainers 12 to a base support 14 on an upper surface of laptop 4. Base support 14 defines one or more retention channels arranged to receive respective retainers 12 therein. Retainers 12 and channels 16 cooperate to allow movement of segments 6, 8 from stowed position "A" to tented position "C" and splayed position "D."

"Retainer" as used herein refers to any structure suitable to secure keyboard segment 6, 8, to base support 14. Retainer 12 may be fixed or moveable with one or more degrees of freedom relative to either of segments 6, 8 or base support 14 and still suitably retain segments 6, 8. Retainers prevent separation of segments 6, 8 from base support 14 and may allow segments 6, 8 while retained to base support 14.

In some illustrated embodiments, retainers 12 define a vertical or columnar extent. In many embodiments, not separately illustrated, however, retainers 12 have a minimal vertical extent and may be characterized by low profile retainer features arranged to attach segments 6, 8 to base support 14. For example, an hourglass or double lobe type retainer with minimal distance between the lobes may be used in complementary sockets and channels on keyboard segments 6, 8 and base support 14. Similarly, a head of retainer 12 may be received within channel 16 and present a protrusion connectable to keyboard segments 6, 8 via snap-fit or other suitable connection. Accordingly, retainers 12 are not limited to columnar, elongated, or other illustrated or described configurations and may be any shape or construction suitable to retain segments 6, 8 to base support 14.

While base support 14 is depicted as defining two channels 16, each corresponding to one of segments 6, 8, it is understood that a single channel 16 in base support 14 can provide sufficient lateral movement for tenting of segments 6, 8. Accordingly, descriptions or depictions of multiple channels may be understood to also generally apply to implementations having but a single channel. In some cases, multiple channels may provide design advantages as to visual symmetry of keyboard 2 relative to the body of laptop 4 in either a stowed position or operational position. In some cases, a single channel design may provide improved ease of use by allowing a user to manipulate joint 10 with one hand and manually lock retainer 12 within a single channel 16.

"Channel" as used herein refers to a structure suitable to restrain retainer 12 in at least one direction, while permitting movement of retainer 12 in another direction. For example, channel 16 may be a slot, groove, guide or track in the conventional sense of the word, but is not so limited. Channel 16 may be, for example a socket which restrains retainer 12 from separation therefrom while permitting pivoting or rotational movement therein.

With reference now to FIGS. 6A and 6B, channel 16, 16' is defined in base support 14 to receive retainer 12, 12' and allow for lateral travel and/or rotational freedom of movement of retainers 12, 12'. Base support 14 may be a chassis surface or body panel surface of laptop 4, or any structure suitable to serve as the support structure or foundation for segments 6, 8 of keyboard 2 during deployment and use. Thus, while base support is depicted as a generally planar upper surface of laptop 4, lateral laptop surfaces and other structures may also be suitable. For example, base support 14 may be a panel or frame structure insertable into a recess defined in the body of laptop 4. Alternatively, base support 14 may be a panel or frame structure constructed as a stand alone base such that keyboard 2 may instead be used as a stand alone peripheral input device, e.g., for connection to a desktop computer.

Base support 14 has defined therein, one or more channels 16, 16' constructed to receive retainer 12, 12', which is attached to a corresponding keyboard segment 6, 8. Channel 16, 16' is constructed to restrain a retainer head 18, 18' in a vertical plane and thereby retain segment 6 or 8 to base support 14. Channel 16, 16' is also constructed to provide clearance for retainer 12, 12' to spin therein as keyboard segments 6, 8 are splayed and for retainer 12, 12' to slide therein as segments 6, 8 are tented. In some cases, only a fraction of an inch of lateral sliding clearance is sufficient to allow for full movement of segments 6, 8 into tented position "C."

Similarly, rotation of retainer 12, 12' within channel 16, 16' may be restricted to a discrete range suitable to allow for full movement of segments 6, 8 into splayed position "D." While retainer heads 18 and 18' are depicted as being substantially symmetrical shapes, in some implementations, retainer head 18 may define an eccentric shape, e.g., a cammed shape so as to impact upon sidewalls of channel 16 at one or both extremes of a predetermined range of rotation. In some implementations, an eccentric or cammed retainer head 18 configuration may be advantageous in locking or restricting retainer 12 in a fixed position within channel 16. For example, a manual or powered actuator may urge retainer head 18 to impact upon the sidewalls of channel 16. Accordingly, retainer head 18, 18' may be constructed to provide free lateral movement and/or rotation within channel 16, 16' in a first orientation and to restrict lateral movement and/or rotation in a second orientation.

With reference to FIG. 7, channel 16" may provide various discrete positions or a positional path or network for retainer 12 to achieve a range of tenting and splaying positions of keyboard 2. Accordingly, channel 16 need not be limited to a single course or to a linear or uniform configuration, but may be curved, inclined, tapered, or the like. Similarly, retainer 12 may be of any number of symmetrical or asymmetrical shapes and may include resilient or engaging features to facilitate positional locking For example, a resilient retainer head or convex retainer head may provide frictional engagement with a tapered upper surface of channel 16. Alternatively, a serrated retainer head surface may positively engage complimentary recesses on a channel surface. Accordingly, any number of frictional, mating or positively engaging features may be used to restrict movement of retainers 12 within channel 16.

Figure 8:
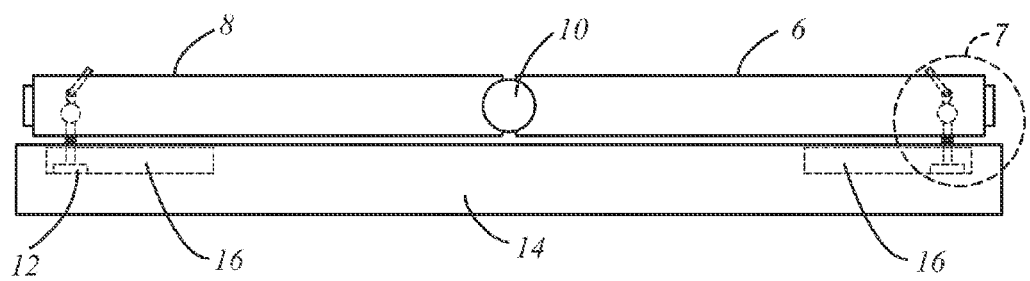
FIG. 8 and the accompanying exploded detail of FIG. 9 illustrate positional relations between keyboard segments, retainers and channels in stowed position of an adjustable integrated ergonomic keyboard in accord with some implementations and configurations of the present invention.
Figure 9:
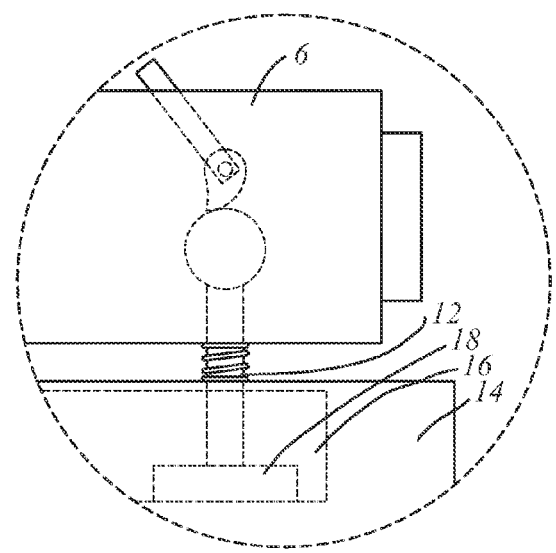

With reference to FIG. 8 and the accompanying exploded detail of FIG. 9, keyboard segments 6, 8 arc in a stowed position closely spaced to base support 14, with retainers 12 positioned accordingly within channels 16. While a particular columnar retainer is used to illustrate one frictionally engageable configuration, the invention is not so limited, and any number of suitable retainer configurations, including low profile retainers, may be used. Keyboard 2 may be held in the stowed position by retainers 12 or, alternatively, by a separate latching mechanism. Suitable latching mechanism may provide releasable connections via magnetic forces, snap-fit, positive engagement of complementary features, and the like.

With reference to FIG. 9, in some implementations, keyboard segment 6 or 8 may be biased towards a deployed position. For example, spring 20 may urge keyboard segment 6 away from base support 14 into a partially deployed position. Spring 20 may be arranged concentric to retainer 12 or may be alternatively suitably arranged between segment 6 and base support 14.

In some implementations, retainer head 18 may be biased by spring 20 towards a top or bottom surface of channel 16 to restrict movement of retainer 12 within the channel. For example, a spring may restrict movement of retainer 12 in a first default position and may be overcome by manual or powered actuation to release retainer 12 within channel 16. Alternatively, a spring may be used to bias retainer 12 towards a freely movable position and may be overcome by manual or powered actuation to restrict movement of retainer 12 within channel 16. Spring 20 may also serve as a clutching mechanism so that if too much pressure is exerted on the keyboard segments 6, 8, spring 20 allows for slippage between retainer 12 and channel 16. Suitable springs may include any suitable mechanical spring, resilient elastomeric material or other known biasing mechanism. In some cases, mechanical or electrical actuators may serve to urge retainers 12 and/or segments 6 or 8 towards deployed and/or stowed positions. In some implementations, the keyboard is moveable between stowed and deployed positions without the need for springs, biasing means, or actuators. For example, such movement may be accomplished purely manually.

Figure 10:
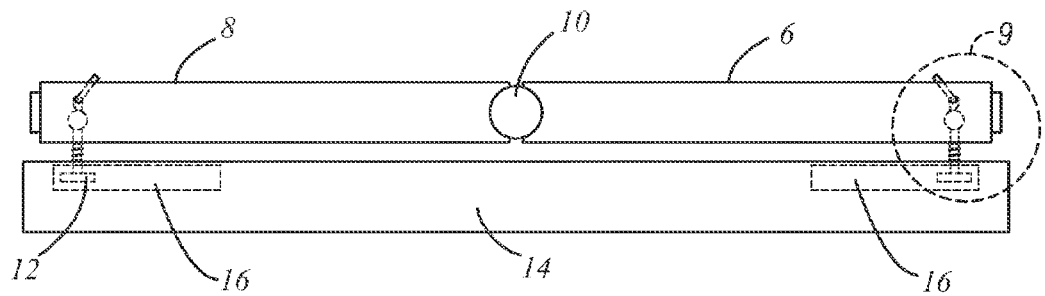
FIG. 10 and the accompanying exploded detail of FIG. 11 illustrate positional relations between keyboard segments, retainers and channels in a released, but unlocked position of an adjustable integrated ergonomic keyboard in accord with some implementations and configurations of the present invention.
Figure 11:
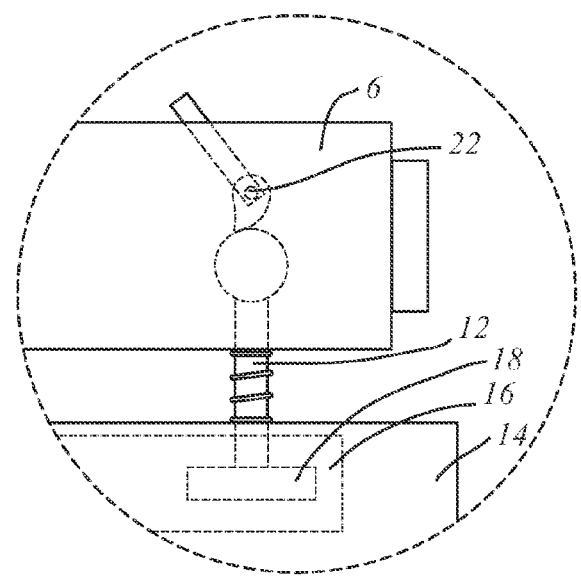

With reference to FIG. 10 and the accompanying exploded detail of FIG. 11, keyboard segments 6, 8, are in a partially deployed position with retainers 12 being moveable within channels 16. Retainers 12 are shown in a released and unlocked position, which permits adjustment of ergonomic keyboard 2 by a user to a desired tented and splayed position.

Figure 12:
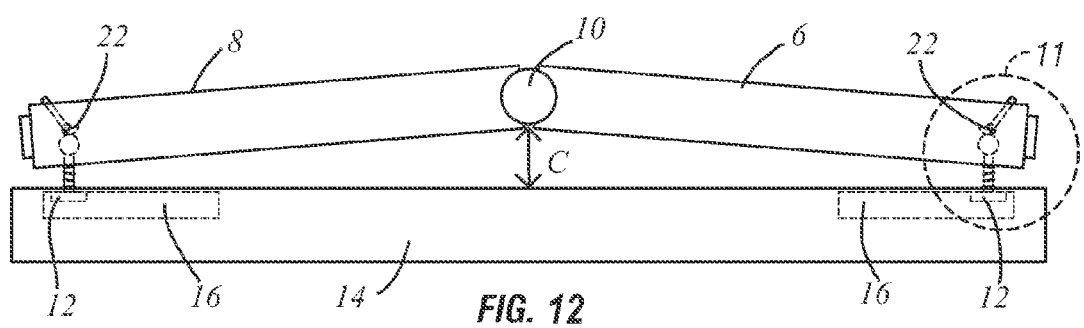
FIG. 12 and the accompanying exploded detail of FIG. 13 illustrate positional relations between keyboard segments, retainers and channels in a tented and locked position of an adjustable integrated ergonomic keyboard in accord with some implementations and configurations of the present invention.
Figure 13:
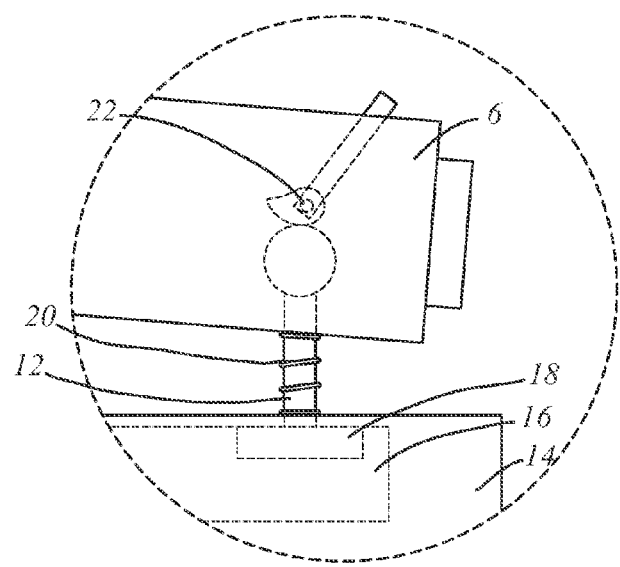

With reference to FIG. 12 and the accompanying exploded detail of FIG. 13, keyboard segments 6, 8 are held in tented position "C" via retainers 12, which are restricted laterally within channels 16. Movement between the partially deployed position of FIG. 10 and tented position "C" is accomplished by inward lateral movement of one or more of retainers 12 within channels 16. Upon movement of segments 6, 8 from the released, partially deployed position to tented position "C," the user may engage a locking mechanism 22 to restrict outward lateral movement of one or more of retainers 12 within channels 16.

With reference to FIGS. 11 and 13, locking mechanism 22 is depicted as a levered cam acting upon retainer 12. In a first position shown in FIG. 11, locking mechanism 22 is actuated to overcome spring 20 and distance retainer head 18 from a top frictional surface of channel 16. In a second position shown in FIG. 13, locking mechanism 22 is retracted somewhat to permit spring 20 to again urge retainer head 18 into contact with frictional contact or mating contact with a surface of channel 16. Frictional contact may be provided between any portion of retainer 12 and channel 16. "Mating contact" refers to positive engagement of cooperative features to provide shear resistance to movement.

The pivotable or levered cammed mechanism is but one example of locking mechanism 22. Any number of manually actuatable mechanisms such as levers, push buttons, dials, sliders, cables, and the like may be used to selectively restrict movement of retainers 12 and thereby movement of segments 6, 8 relative to base support 14. Powered actuators such as solenoids, worm drives, gear trains or the like may likewise be used to selectively restrict movement of retainers 12. It will be understood that locking mechanism 22 may be arranged on either keyboard 2 or base support 14 to suitably restrict retainer 12 within channel 16. Similarly, while retainers 12 are generally depicted as extending from keyboard 2 to be received within channels 16 formed in base support 14, retainers 12 may extend, instead from base support 14 to be received in channels 16 formed in keyboard 2.

Accordingly, while some embodiments are depicted as including a locking mechanism 22 and spring 20 associated with retainers 12, it will be understood that other embodiments are not so limited. For example, the springs may be omitted or the locking mechanisms may be provided instead at joint 10. Similarly, joint 10 may be self locking, e.g., due to joint friction or other suitable resistance.

In some implementations, a locking mechanism structure include substantially alignable apertures defined in adjacent locking plates, wherein one or both of the locking plates is moveable to substantially misalign the apertures to bind upon and thereby lock a retainer disposed therein. In some cases, relative positioning of the locking plates determines a retainer positioning and thereby a keyboard deployed position.

In some implementations, the retainer includes a ball which may be seated in a recess in a stowed position. The retainer ball may be unseated from the recess to move the segments into a deployed position. For example, a splay actuator and/or tenting actuator, e.g., lever or cable, causes the retainer ball to slide within a channel formed on one of the base support and a keyboard segment. A curved channel or non-planar channel may serve to provide both tenting and splaying motions.

In some implementations, actuators may act on the joint 10 with retainers 12 tracking or responsive to movement of joint 10.

In some implementations, thumbwheels or other rotary actuator serve to move the keyboard segments between stowed and deployed positions. For example, the retainers may be an axle of a wheel restrained within a channel. Scrolling the wheel along the channel causes tenting and/or splaying of the keyboard segments.

Alternatively, retainers 12 can include threaded knobs which may be rotated to selectively permit and prevent keyboard segment movement. For example, one or more retainer knobs may be loosened to adjust one or both of the splay and pitch of the keyboard segments.

Still in some implementations, underlying supports, e.g., pivoting braces or columns, may be used to maintain the keyboard segments in a desired deployed position. In a particular implementation, the underlying support is provided at the joint between the keyboard segments.

In some implementations, segments 6, 8 may be additionally or alternatively maintained in a tented and/or splayed position via restriction of joint 10 itself. As previously disclosed in U.S. Pat. No. 6,984,081, joint 10 may be compressed into a frictionally restricted state or may be otherwise restricted in a desired position. For example, an elastomeric surface on one of a ball surface and a complementary socket surface of joint 10 may be deformed in response to localized compression from a dimpled complementary surface. Alternatively, complementary projections and/or dimples on opposed joint surfaces may be held in mating engagement via interference fit, a spring, latch or other suitable locking mechanism.

Figure 14:
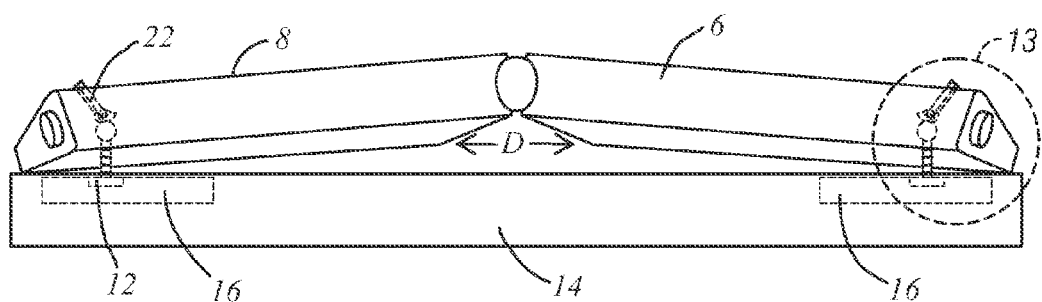
FIG. 14 and the accompanying exploded detail of FIG. 15 illustrate positional relations between keyboard segments, retainers and channels in a tented, splayed and locked position of an adjustable integrated ergonomic keyboard in accord with some implementations and configurations of the present invention.
Figure 15:
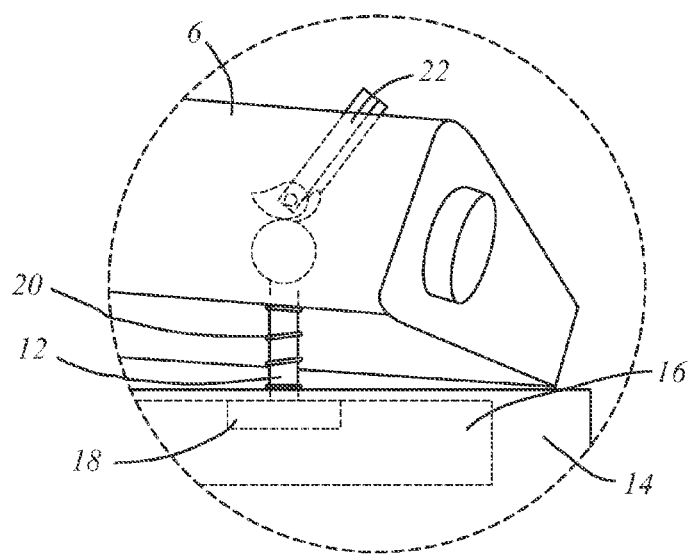

With reference to FIG. 14 and the accompanying exploded detail of FIG. 15, keyboard segments 6, 8, are held in splayed position "D." Retainers 12 permit movement from a partially deployed position or even from a tented position to splayed position "D" via rotation of retainers 12 within channels 16. Splaying of segments 6, 8 involves a rotation movement as well as translational movement of retainer 12. Splaying of segments 6, 8 about joint 10 causes inward movement of retainers 12 as joint 10 travels forward towards the user. Splaying further causes rotation of or about retainer 12 as outer lower quadrants of keyboard segments 6, 8 swing outward in response to forward movement of joint 10.

In some implementations, locking mechanism 22 is constructed to resist both translation and rotation of retainers 12 within channels 16. In some implementations, separate locking mechanisms may be provided to resist each movement separately. For example, in some implementations, constant resistance to rotation of retainer 12 may be provided, sufficient to resist forward or rearward movement of joint 10 during normal typing operations, yet subject to direct manual manipulation of joint 10 between deployed and stowed positions. Such limited slip or clutched arrangements may be achieved by frictional engagement or other engagement of retainer head 12 and channel 16 under the force of spring 20 or other suitable mechanism. Alternatively, sufficient rotational resistance may be provided within joint 10 itself. For example, joint 10 may be a ball and socket joint with sufficient interference fit to permit movement only under a predetermined degree of manual force.

Alternatively, joint 10 may be selectively resistant, for example, via release of a compression fit within joint 10 via a manual actuator.

It may be further advantageous to provide for slippage or release of the locking mechanism upon application of a predetermined downward pressure, for example during abrupt closure upon keyboard 2 of a laptop lid portion. In some implementations, closure of the laptop lid releases a locking mechanism to return keyboard 2 to a stowed position. Alternatively, in some implementations, the laptop lid is prevented from closing or may receive additional resistance to closure while keyboard 2 is deployed. In some cases, cables, levers, push pins, or other suitable mechanical or electrical actuator may be associated with the laptop lid or lid hinge to act on a keyboard locking mechanism during laptop lid closure. Such actuators may similarly be used to urge keyboard 2 into a deployed position during opening of the laptop lid. For example, a cable may be drawn by laptop lid movement to urge retainers towards one of a deployed or stowed position.

Figure 16:
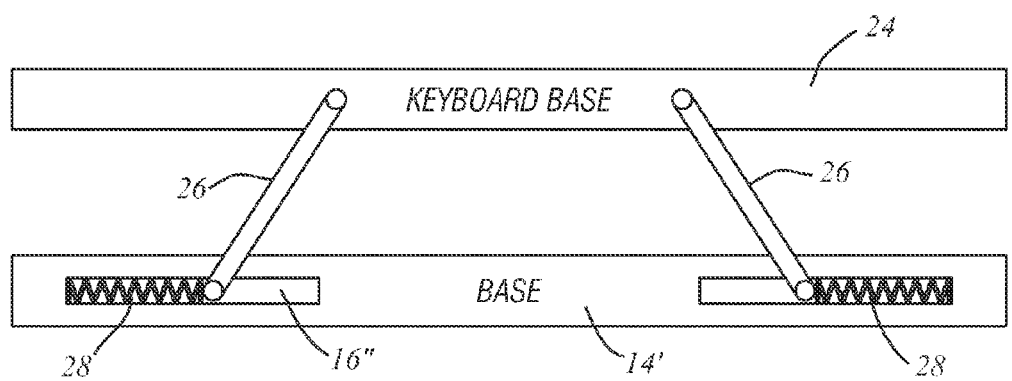
FIG. 16 depicts an extendible, and upwardly deployed, keyboard base surface for use in conjunction with some implementations and configurations of an adjustable integrated ergonomic keyboard in accordance with the present invention.
Figure 17:
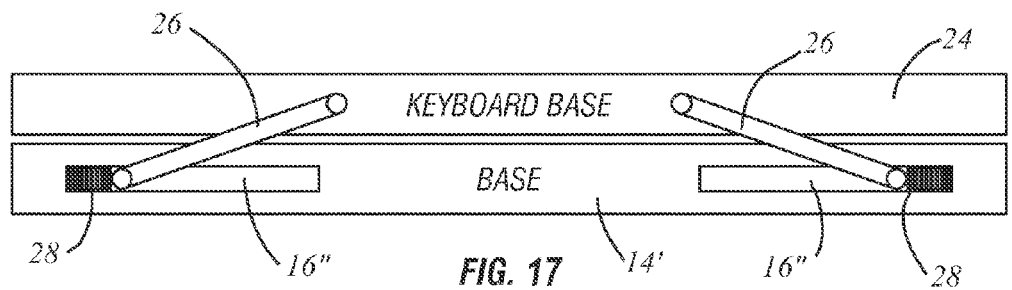
FIG. 17 depicts the keyboard base surface stowed in accord with some implementations and configurations of the present invention.

With reference to FIG. 16, an upwardly deployable keyboard base 24 serves to elevate at least a portion of keyboard 2 above base support 14'. If supporting linkage 26 is retained at one end in channel 16" formed in base support 14'. Keyboard base 24 may be stowed as shown in FIG. 17, by collapsing of linkages 26 as springs 28 are compressed within channels 16".

In some laptop integrated embodiments, segments 6, 8 are independently electrically connected in parallel to laptop 4. In other embodiments, segments 6, 8 are electrically coupled in series to provide a single output to laptop 4. Accordingly, segments 6, 8 may be electrically connected to or integrated with laptop 4 in any suitable manner. In some embodiments, it may be advantageous or desirable for the electrical connections, e.g., data cables, to be located near retainers 12 to minimize the cable length or cable movement needed to accommodate tenting and/or splaying of keyboard segments 6, 8.

With reference to FIGS. 18, 19, 20 and 21, an adjustable ergonomic keyboard 102 includes keyboard segments 106 and 108 disposed on a stand alone base support 114. Keyboard 102 is configured as a peripheral data input device for use, for example, with a desktop computer 104. Keyboard segments 106, 108 are coupled by a joint/10 and secured to base support 114 by retainers 112. As previously described, joint/10 allows multiple degrees of freedom for tenting and splaying of keyboard 102.

Figure 18:
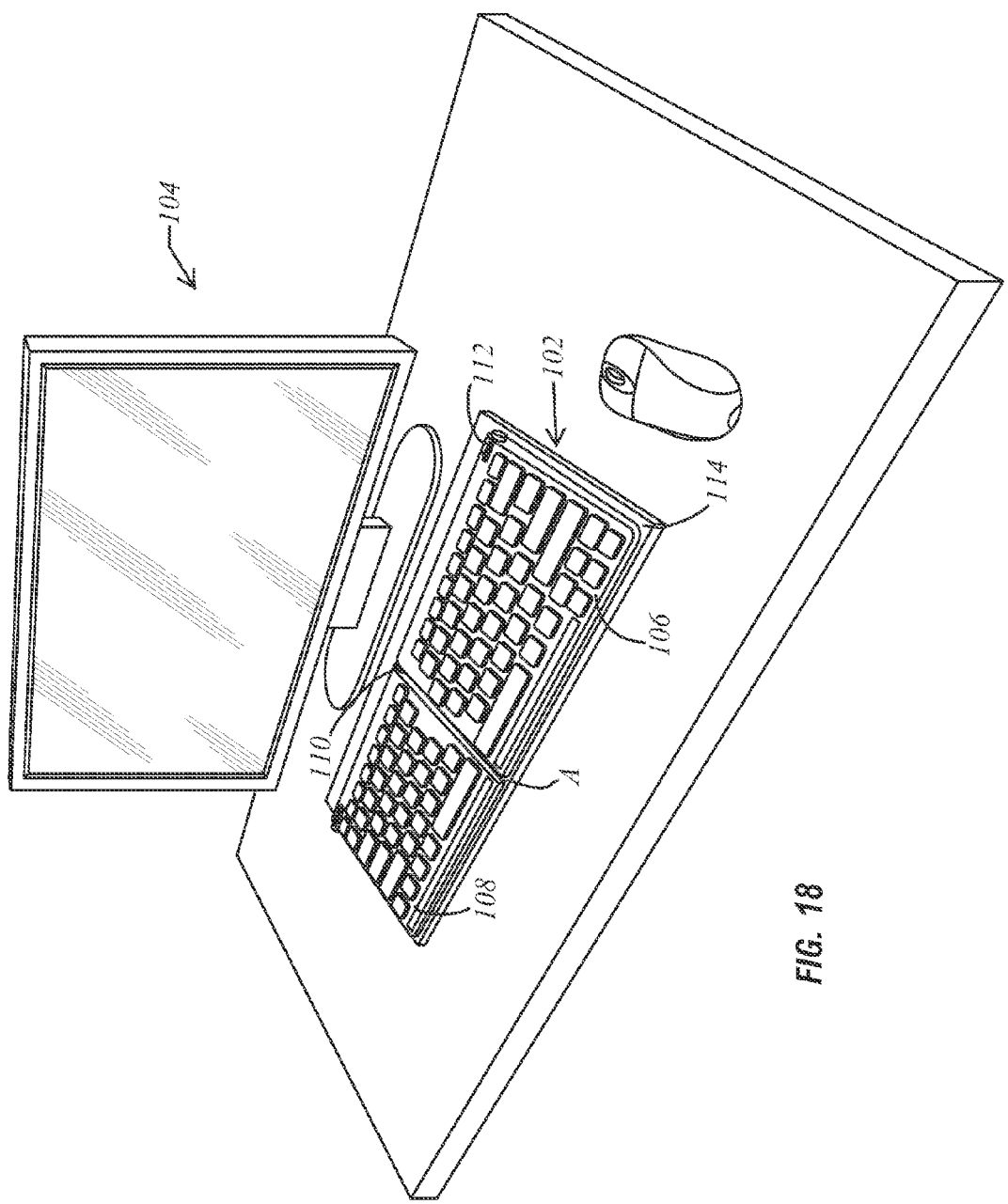
FIGS. 18, 19, 20 and 21 depict various positions of an adjustable ergonomic keyboard integrated with a base (for desktop use) in accordance with some implementations of the present invention.

With reference to FIG. 18, adjustable ergonomic keyboard 102 may be stored in a stowed position "A." In stowed position "A," keyboard segments 106, 108 are positioned close to base support 114 in a substantially planar, side-by-side arrangement. Of course, some users may elect to use keyboard 102 in the stored position in some circumstances.

Base support 114 can be configured with a minimum thickness and mass sufficient to support segments 106, 108. Such thin, lightweight designs may be advantageous or desirable for portability or stylistic considerations. For example, a lightweight aluminum or plastic panel or framework may provide a suitable base support 114 for segments 106, 108. In some desktop applications, a more substantial base may be advantageous or desirable for some users.

Base support 114 need not be coextensive with keyboard segments 106, 108 to provide sufficient support. For example, base support 114 may extend only under a portion of segments 106, 108 between retainers 112. In some implementations, segments 106, 108 may include a lower protective panel or cover and may be arranged to directly contact an upper surface of a desk with keyboard 102 in the splayed and/or tented positions. Accordingly, in some implementations, base support 114 may serve to maintain a relative position of retainers 112, without regard to contact between base support and any underlying surface.

Keyboard 102, including base support 114, may include any number of data ports or peripheral devices. For example, pointing devices or mass storage devices may be connected to keyboard 102 via USB port, PS2 port or other data ports. Similarly, any suitable connectivity or communication facilities, for example wireless communication via Bluetooth® technology, RF, IR, and the like may be used to connect keyboard 102 to computer 104. Such data ports and communications hardware may be housed on base support 114. For example, base support 114 may include a housing portion along an upper edge portion for any necessary hardware, batteries, data ports and the like.

Keyboard segments 106, 108 may be electrically coupled such that data is output from the segment pair from a single data port. For example, a flexible data cable or other suitable contact or electrical connector may be provided between segments 106, 108 near joint 10. Additionally, an infrared, radio or other electromagnetic or optical signal may be used to transmit signals from the keyboard to the computing device without the need for a cable or other physical connection.

Alternatively, segments 106, 108 may each include a separate data output connection. For example, each of keyboard segments 106, 108 may be treated, effectively, as a separate peripheral device. For example, a small USB hub may be provided on base support 114 to receive input from separate USB connectors on the respective segments 106, 108 and to provide a single output to computer 104. It may be advantageous to position the data output connections near retainers 112 to minimize the length and movement of the data output connections between keyboard segment positions. Such a connection may be configured to accommodate the fraction of an inch of lateral retainer travel and a predetermined arc of keyboard segment travel for a range of tented and splayed positions. Alternatively, electrical connections and data outputs may reside entirely on segments 106, 108 without electrical connection to base support 114. USB is but one example of wired connectivity and any number of other standards may be used to connect keyboard 102 as a peripheral or integrated device. In some cases, base support 114 supports segments 106, 108 without any electrical connection thereto. In other case, base support 114 carries data cables or other electrical communication devices.

Figure 19:
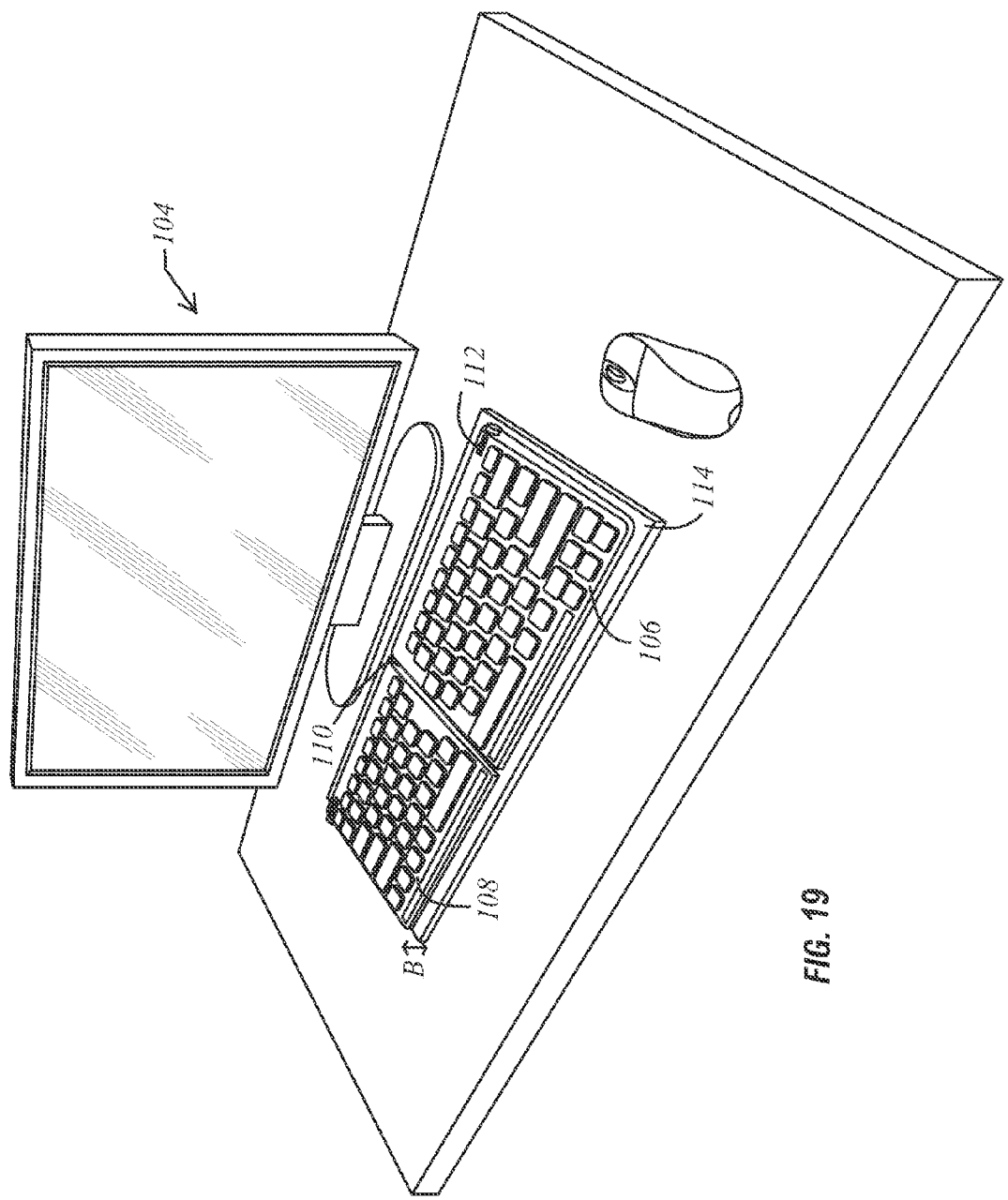

With reference to FIG. 19, keyboard 102 is in a released, unlocked or partially deployed position "B." In partially deployed position "B" keyboard segments 106, 108 are moveable to a desired tented or splayed position. Movement from stowed position "A" to partially deployed position "B" may include a simple unlocking action and need not include substantial relative movement or separation of keyboard segments 106, 108 from base support 114. In some cases, release of segments 106, 108 from the stowed position provides sufficient separation of segments 106, 108 from base support 114 to permit insertion of a user's fingers therebetween to manipulate segments 106, 108 into the positions shown in FIGS. 20-21. In some implementations, keyboard segments 106, 108 may be biased towards at least one of a partially splayed position and a partially tented position such that releasing segments 106, 108 from stowed position "A" results in a partially splayed and/or partially tented position.

Figure 20:
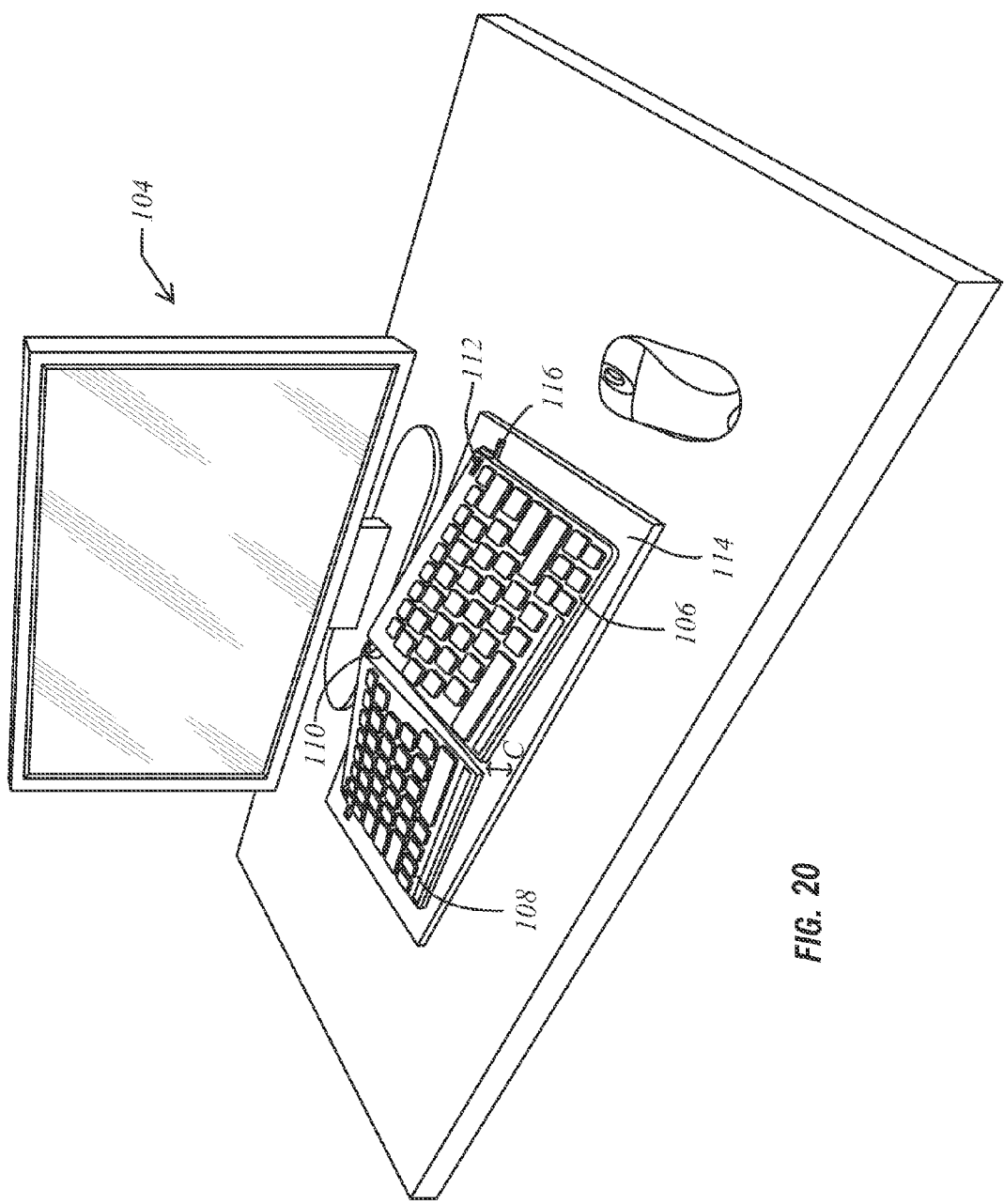

With reference to FIG. 20, keyboard segments 106, 108 are in a tented position "C." Tented position "C" is achieved by upward movement of joint 110 and inward movement of at least one of retainers 12 along channel 116 formed in base support 114.

Figure 21:
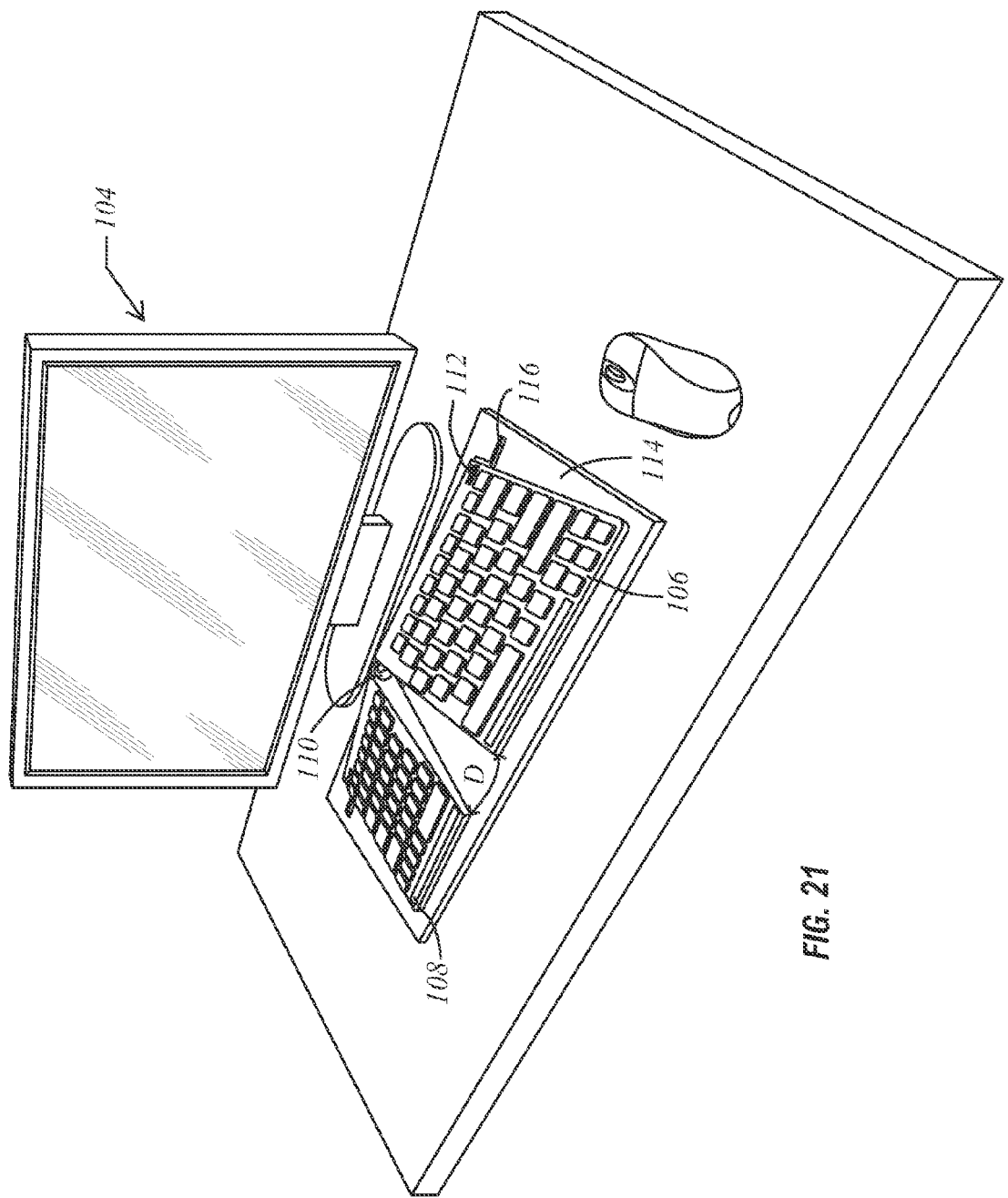

With reference to FIG. 21, keyboard segments 106, 108 are in a splayed and tented position. Splayed position "D" is achieved by forward movement of joint 110, movement of at least one of retainers 12 along channel 116 formed in base support 114 and rotation of segments 106, 108 about respective retainers 112. Keyboard segments 106, 108 may be locked to resist movement from positions "C" and "D." Advantageously, in some stand alone or desktop implementations, keyboard 2 may be more securely fixed in positions "C" and "D" since there will be less need for repeated keyboard setup as with portable laptop implementations. Similarly, resistance of keyboard 102 to flattening of tented position "C" may be greater absent other considerations present in a portable laptop implementation.

Keyboard segments 106, 108 may include friction pads at points of contact with base support 114 or with an underlying surface to provide additional resistance to movement during typing. For example, rubber foot pads, or the like, may be provided at the lower outermost extremities of segments 106, 108 to frictionally engage base support 114 or a desk and resist outward movement of segments 106, 108 under downward pressure, e.g., during typing.

In some implementations, resistance to flattening of tented segments 106, 108 may be provided by one locking mechanism and resistance to counter-rotation of splayed segments by another mechanism. For example, resistance to flattening may be provided by any suitable tensile structure between retainers 112, e.g., a rigid or semi-rigid base or even a cable. Resistance to counter-rotation of splayed segments may be provided by resistance at one or more of retainers 112 and joint 110. In a particular implementation, resistance to rotation of segments 106, 108 is provided at each of retainers 112 and joint 110, with release of resistance at a selected one of retainers 112 or joint 110 allowing for manual rotation of segments 106, 108. In some implementations, sufficient resistance may be provided by joint 10 or 110 alone to maintain position "C" and/or "D."

In some implementations, base support 114 may include surface features configured to provide discrete positioning or incremental resistance points. For example, a series of depression or ridges may be provided on base support 14 or 114 to more positively engage corresponding contact surfaces of segments 106, 108.

In some implementations, a web may be provided between segments 106, 108 to provide an appearance of central keyboard continuity in splayed position "D". Such a web may be slidably deployed from the underside segments 106, 108 and may contribute resistance to movement.

In some implementations, base support 14, 114 is adjustable to facilitate movement of keyboard segments to positions "C" or "D." For example, base support may be collapsible to move retainers 112 closer together to achieve tented position "C."

In each case, it will be understood that the configuration of the keys on segments 6, 8, 106, 108 may be in any suitable form which allows access to the appropriate hand corresponding to segments 6, 8, 106, 108, and need not be the configuration shown in FIG. 1.

Similarly, segments 6, 9, 106, 108 may include virtual keys, e.g., keys displayed on a touch screen panel, membrane display, or other suitable display besides a traditional vertically operable contact type key. For example, as an alternative to conventional mechanical switches, keyboard inputs may include pressure sensors, static sensors, position sensors, capacitance sensors, or other suitable contact or non-contact sensors. For example, segments 6, 9, 106, 108 may simply be projection surfaces for use with a laser and infrared projected virtual keyboard. In some embodiments, segments 6, 8, 106, 108 a part of a membrane keyboard, dome-switch keyboard, scissor-switch keyboard, capacitive keyboard, mechanical-switch keyboard, buckling-spring keyboard, hall-effect keyboard, or laser keyboard. Accordingly, any suitable manual data entry system may be presented on segments 6, 9, 106, 108 to be arranged in a tented and/or splayed position by a user.

It should be appreciated that splaying of the segments 6, 8, 106, 108 acts to prevent or reduce ulnar deviation of the user's hands and wrists, while pitching or "tenting" movement of segments 6, 8, 106, 108 acts to prevent or reduce pronation of the user's wrists.

In some implementations, an optional support (not shown) may be provided generally below the hinge or joint 10, 110 so as to maintain the central region of the keyboard 2, 102 at a raised preselected level, if needed.

Operation and manipulation of the keyboard 2, 102 of the present invention will now be described. When it is desired to set a new position of keyboard segments 6, 8, 106, 108 relative to one another, retainers 12, 112 and or joints 10, 110 are allowed to move, e.g., translate and/or rotate, to accommodate splayed and/or tented keyboard positions. After a desired orientation of the segments 6, 8, 106, 108 relative to one another is achieved, the segments are held in position by resistance at at least one of retainers 12, 112 and/or joints 10, 110. In the locked position, keyboard 102 remains substantially as arranged under normal typing conditions.

While the forgoing represents a description of various embodiments or implementations of the invention, it is to be understood that the claims below recite the features of the present invention, and that other embodiments, not specifically described hereinabove, fall within the scope of the present invention.

What is claimed is:

1. An input device, comprising:
   a base;
   a first keyboard segment that includes a first keying surface and that is moveably coupled to the base;
   a second keyboard segment that includes a second keying surface and that is moveably coupled to the base; and
   a joint that connects the first keyboard segment to the second keyboard segment and that allows movement of the first keyboard segment relative to the second keyboard segment;
   wherein the joint and the moveable couplings of the first keyboard segment and the second keyboard segment to the base allow movement of the first keyboard segment and the second keyboard segment relative to the base and into at least one of a tented orientation and a splayed orientation.

2. The input device of claim 1, wherein the base includes at least one retention channel defined therein, wherein each of the first and second keyboard segments include a retainer, and wherein a head portion of the retainer is disposed within the at least one retention channel, thereby moveably coupling the first and second keyboard segments to the base.

3. The input device of claim 2 wherein the head portion of the retainer includes at least one of a resilient retainer head and a convex retainer head, and wherein the head portion provides frictional engagement with a tapered surface of the at least one retention channel.

4. The input device of claim 2 wherein the head portion of the retainer includes a serrated surface, wherein the at least one retention channel includes a channel surface having at least one recess, and wherein the serrated surface engages the at least one recess of the channel surface.

5. The input device of claim 1, wherein the joint resists movement, by way of a frictionally engageable surface, of the first keyboard segment and the second keyboard segment relative to the base and out of the splayed orientation.

6. The input device of claim 1, wherein the joint resists movement, by way of a frictionally engageable surface, of the first keyboard segment and the second keyboard segment relative to the base and out of the tented orientation.

7. The input device of claim 1, wherein the movable couplings resist movement, by way of a frictionally engageable surface, of the first keyboard segment and the second keyboard segment relative to the base and out of the splayed orientation.

8. The input device of claim 1, wherein the movable couplings resist movement, by way of a frictionally engageable surface, of the first keyboard segment and the second keyboard segment relative to the base and out of the tented orientation.

9. The input device of claim 1, further comprising:
   a biasing mechanism that is coupled to the first keyboard segment and the second keyboard segment, wherein the biasing mechanism biases the first keyboard segment and the second keyboard segment into the at least one of the tented orientation and the splayed orientation.

10. The input device of claim 1, further comprising:
    at least one of a mechanical actuator and an electrical actuator that is coupled to the first keyboard segment and the second keyboard segment, wherein the at least one of the mechanical actuator and the electrical actuator allows the first keyboard segment and the second keyboard segment to move into the at least one of the tented orientation and the splayed orientation.

11. The input device of claim 1, further comprising:
    at least one of a mechanical actuator and an electrical actuator that is coupled to the first keyboard segment and the second keyboard segment, wherein the at least one of the mechanical actuator and the electrical actuator is configured to move the first keyboard segment and the second keyboard segment from the at least one of the tented orientation and the splayed orientation and into a stowed position.

12. A computing system, comprising:
    a base chassis that houses at least one computing component;
    a first keyboard segment that is moveably coupled to the base chassis;
    a second keyboard segment that is moveably coupled to the base chassis; and
    a joint that connects the first keyboard segment to the second keyboard segment and that allows movement of the first keyboard segment relative to the second keyboard segment;
    wherein the joint and the moveable couplings of the first keyboard segment and the second keyboard segment to the base chassis allow movement of the first keyboard segment and the second keyboard segment relative to the base chassis and into at least one of a tented orientation and a splayed orientation.

13. The computing system of claim 12, wherein the base chassis includes at least one retention channel defined therein, wherein each of the first and second keyboard segments include a retainer, and wherein a head portion of the retainer is disposed within the at least one retention channel, thereby moveably coupling the first and second keyboard segments to the base chassis.

14. The computing system of claim 13 wherein the head portion of the retainer includes at least one of a resilient retainer head and a convex retainer head, and wherein the head portion provides frictional engagement with a tapered surface of the at least one retention channel.

15. The computing system of claim 13 wherein the head portion of the retainer includes a serrated surface, wherein the at least one retention channel includes a channel surface having at least one recess, and wherein the serrated surface engages the at least one recess of the channel surface.

16. The computing system of claim 12, wherein the joint resists movement, by way of a frictionally engageable surface, of the first keyboard segment and the second keyboard segment relative to the base chassis and out of the splayed orientation.

17. The computing system of claim 12, wherein the joint resists movement, by way of a frictionally engageable surface, of the first keyboard segment and the second keyboard segment relative to the base chassis and out of the tented orientation.

18. The computing system of claim 12, wherein the movable couplings resist movement, by way of a frictionally engageable surface, of the first keyboard segment and the second keyboard segment relative to the base chassis and out of the splayed orientation.

19. The computing system of claim 12, wherein the movable couplings resist movement, by way of a frictionally engageable surface, of the first keyboard segment and the second keyboard segment relative to the base chassis and out of the tented orientation.

20. The computing system of claim 12, further comprising:
a biasing mechanism that is coupled to the first keyboard segment and the second keyboard segment, wherein the biasing mechanism biases the first keyboard segment and the second keyboard segment into the at least one of the tented orientation and the splayed orientation.

21. The computing system of claim 12, further comprising:
at least one of a mechanical actuator and an electrical actuator that is coupled to the first keyboard segment and the second keyboard segment, wherein the at least one of the mechanical actuator and the electrical actuator allows the first keyboard segment and the second keyboard segment to move into the at least one of the tented orientation and the splayed orientation.

22. The computing system of claim 12, further comprising:
at least one of a mechanical actuator and an electrical actuator that is coupled to the first keyboard segment and the second keyboard segment, wherein the at least one of the mechanical actuator and the electrical actuator is configured to move the first keyboard segment and the second keyboard segment from the at least one of the tented orientation and the splayed orientation and into a stowed position.

23. A method, comprising:
providing a first keyboard segment that is moveably coupled to a base through a first moveable coupling, a second keyboard segment that is moveably coupled to the base through a second moveable coupling, and a joint connecting the first keyboard segment and the second keyboard segment; and
moving each of the first keyboard segment and the second keyboard segment relative to the base using the first moveable coupling, the second moveable coupling, and the joint such that the first keyboard segment and the second keyboard segment are positioned in at least one of a tented orientation and a splayed orientation.

24. The method of claim 23, wherein the base includes at least one retention channel defined therein, wherein each of the first and second keyboard segments include a retainer, and wherein a head portion of the retainer is disposed within the at least one retention channel, thereby providing the first and second keyboard segments moveably coupled to the base.

25. The method of claim 24, further comprising:
frictionally engaging the head portion of the retainer with a tapered surface of the at least one retention channel, wherein the head portion includes at least one of a resilient retainer head and a convex retainer head.

26. The method of claim 24, further comprising:
engaging a serrated surface of the head portion of the retainer with at least one channel surface recess of the at least one retention channel.

27. The method of claim 23, further comprising:
resisting movement of the first keyboard segment and the second keyboard segment relative to the base and out of the splayed orientation using a frictionally engageable surface of the joint.

28. The method of claim 23, further comprising:
resisting movement of the first keyboard segment and the second keyboard segment relative to the base and out of the tented orientation using a frictionally engageable surface of the joint.

29. The method of claim 23, further comprising:
resisting movement of the first keyboard segment and the second keyboard segment relative to the base and out of the splayed orientation using a frictionally engageable surface of the first and second moveable couplings.

30. The method of claim 23, further comprising:
resisting movement of the first keyboard segment and the second keyboard segment relative to the base and out of the tented orientation using a frictionally engageable surface of the first and second moveable couplings.

31. The method of claim 23, further comprising:
biasing the first keyboard segment and the second keyboard segment into the at least one of the tented orientation and the splayed orientation.

32. The method of claim 31, further comprising:
moving, using at least one of a mechanical actuator and an electrical actuator, the first keyboard segment and the second keyboard segment into the at least one of the tented orientation and the splayed orientation.

33. The method of claim 23, further comprising:
moving, using at least one of a mechanical actuator and an electrical actuator, the first keyboard segment and the second keyboard segment from the at least one of the tented orientation and the splayed orientation and into a stowed position.

* * * * *